(12) United States Patent
Yokogawa

(10) Patent No.: US 8,537,321 B2
(45) Date of Patent: Sep. 17, 2013

(54) LIQUID CRYSTAL DISPLAY DEVICE COMPRISING AN ELECTRIC POWER SUPPLY PAD ARRANGED AT A CORNER PORTION OF A SUBSTRATE AND A CONNECTION ELECTRODE HAVING A SLIT THAT CROSSES SIGNAL LINES

(75) Inventor: Akira Yokogawa, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 154 days.

(21) Appl. No.: 13/015,143

(22) Filed: Jan. 27, 2011

(65) Prior Publication Data

US 2011/0187951 A1 Aug. 4, 2011

(30) Foreign Application Priority Data

Jan. 29, 2010 (JP) .................. 2010-019589

(51) Int. Cl.
*G02F 1/1345* (2006.01)
(52) U.S. Cl.
USPC .......................... 349/149; 349/152
(58) Field of Classification Search
USPC ................. 349/149–152
See application file for complete search history.

(56) References Cited

U.S. PATENT DOCUMENTS

2006/0139553 A1* 6/2006 Kang et al. ............. 349/149
2009/0231534 A1* 9/2009 Morita .................... 349/153
2010/0271572 A1 10/2010 Yokogawa

FOREIGN PATENT DOCUMENTS

JP 2008-257192 10/2008

* cited by examiner

*Primary Examiner* — Paul Lee
(74) *Attorney, Agent, or Firm* — Oblon, Spivak, McClelland, Maier & Neustadt, L.L.P.

(57) ABSTRACT

In one embodiment, a liquid crystal display device includes a first insulating substrate and a second insulating substrate opposing the first insulating substrate. An electric power supply line formed along a perimeter of the first insulating substrate, and an electric power supply pad is arranged at a corner portion of the first insulating substrate apart from the electric power supply line. A plurality of signal lines are formed crossing between the electric power supply line and the electric power supply pad. An insulating layer covers the signal lines, and a connection electrode is arranged on the insulating layer for connecting the electric power supply line and the electric power supply pad. At least one slit is formed in the connection electrode extending in a direction so as to cross the signal lines. An electrically conductive element connects the electric power supply pad with a counter electrode.

31 Claims, 9 Drawing Sheets

# LIQUID CRYSTAL DISPLAY DEVICE COMPRISING AN ELECTRIC POWER SUPPLY PAD ARRANGED AT A CORNER PORTION OF A SUBSTRATE AND A CONNECTION ELECTRODE HAVING A SLIT THAT CROSSES SIGNAL LINES

CROSS-REFERENCE TO RELATED APPLICATION

This application is based upon and claims the benefit of priority from prior Japanese Patent Application No. 2010-19589, filed Jan. 29, 2010, the entire contents of which are incorporated herein by reference.

FIELD

The present invention relates to a liquid crystal display device using an active matrix.

BACKGROUND

Liquid crystal display devices are widely used as display devices for various kinds of equipment such as personal computers, OA equipments, and TV sets because the display devices have many advantages such as lightness, compactness and low power consumption. In recent years, the liquid crystal display device has also been used in mobile terminal equipments such as a mobile phone, a car navigation device and a game player.

For example, according to Japanese Laid Open Patent Application No. 2008-257192 discloses an electric power supply structure for supplying potential from an array substrate side to a counter electrode arranged on a counter substrate. In the patent application, the array substrate includes an electric power supply line for supplying a predetermined potential to the counter electrode. The electric power supply line includes an electric power supply pad, a first line connected with the power supply pad, a second line in a different conductive layer from the first line, and a bridge line to connect the first and second lines.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
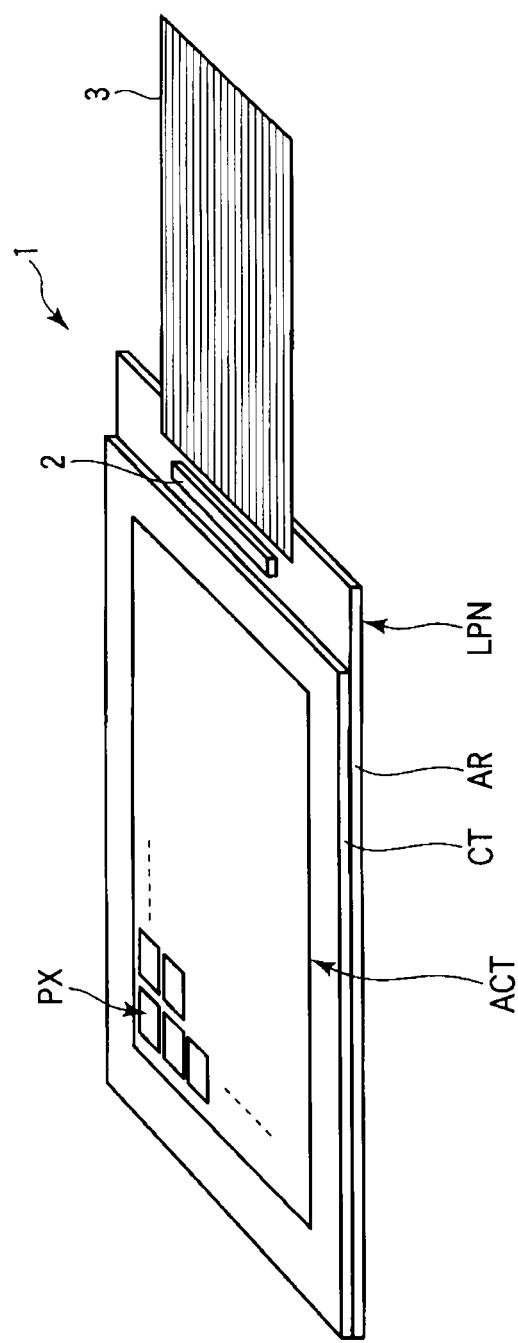
FIG. 1 is a figure schematically showing a structure of a liquid crystal display device according to a first embodiment in the present invention.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first insulating substrate and a second insulating substrate opposing the first insulating substrate; a plurality of pixel electrodes in the shape of a matrix formed on the first insulating substrate; an electric power supply line formed along a perimeter of the first insulating substrate; an electric power supply pad arranged at a corner portion of the first insulating substrate apart from the electric power supply line; a plurality of signal lines formed on the first insulating substrate crossing between the electric power supply line and the electric power supply pad; an insulating layer covering the signal lines; a connection electrode arranged on the insulating layer for connecting the electric power supply line and the electric power supply pad; at least one slit formed in the connection electrode extending in a direction so as to cross the signal lines; a counter electrode formed on the second insulating substrate and extending to above the electric power supply pad, the counter electrode facing the pixel electrodes; an electrically conductive element to connect the electric power supply pad with the counter electrode; and a liquid crystal layer held between the first and second substrates.

According to other embodiment, a liquid crystal display device includes: a first insulating substrate and a second insulating substrate opposing the first insulating substrate; a plurality of pixel electrodes in the shape of a matrix formed on the first insulating substrate; an electric power supply line formed along a perimeter of the first insulating substrate; an electric power supply electrode arranged at a corner portion of the first insulating substrate apart from the electric power supply line; a plurality of signal lines formed on the first insulating substrate crossing between the electric power supply line and the electric power supply electrode; an insulating layer covering the signal lines and including a first contact hole penetrating to the electric power supply line and a second contact hole penetrating to the electric power supply electrode; a connection electrode arranged on the insulating layer for connecting the power supply line and the power supply electrode through the first and second contact holes, respectively; at least one slit formed in the connection electrode extending in a direction so as to cross the signal lines; an electric power supply pad electrically connected with the electric power supply electrode; a counter electrode formed on the second insulating substrate and extending to above the electric power supply pad, the counter electrode facing the pixel electrodes; an electrically conductive element to con-` nect the electric power supply pad with the counter electrode; and a liquid crystal layer held between the first and second substrates.

FIG. 1 is a figure schematically showing a liquid crystal display device in the first embodiment. That is, the liquid crystal display device 1 includes an active-matrix type liquid crystal display panel LPN, a driver IC chip 2, and a flexible printed circuit board 3, etc. connected to the liquid crystal display panel LPN.

The liquid crystal display device panel LPN includes an array substrate (first substrate) AR, a counter substrate (second substrate) CT opposing the array substrate, and a liquid crystal layer LQ held between the array substrate AR and the counter substrate CT. The array substrate AR and the counter substrate CT are attached together by a seal element which is not illustrated.

The liquid crystal display panel LPN includes a display area ACT, i.e., an active area to display image. The active area ACT is constituted by a plurality of pixels PX arranged in the shape of (m×n) matrix (here, m and n are positive integers).

The driver IC chip 2 and the flexible printed circuit board 3 are mounted on the array substrate AR in the outside of the active area ACT and function as a signal source to supply signals required for the driving of the pixels PX.

Figure 2:
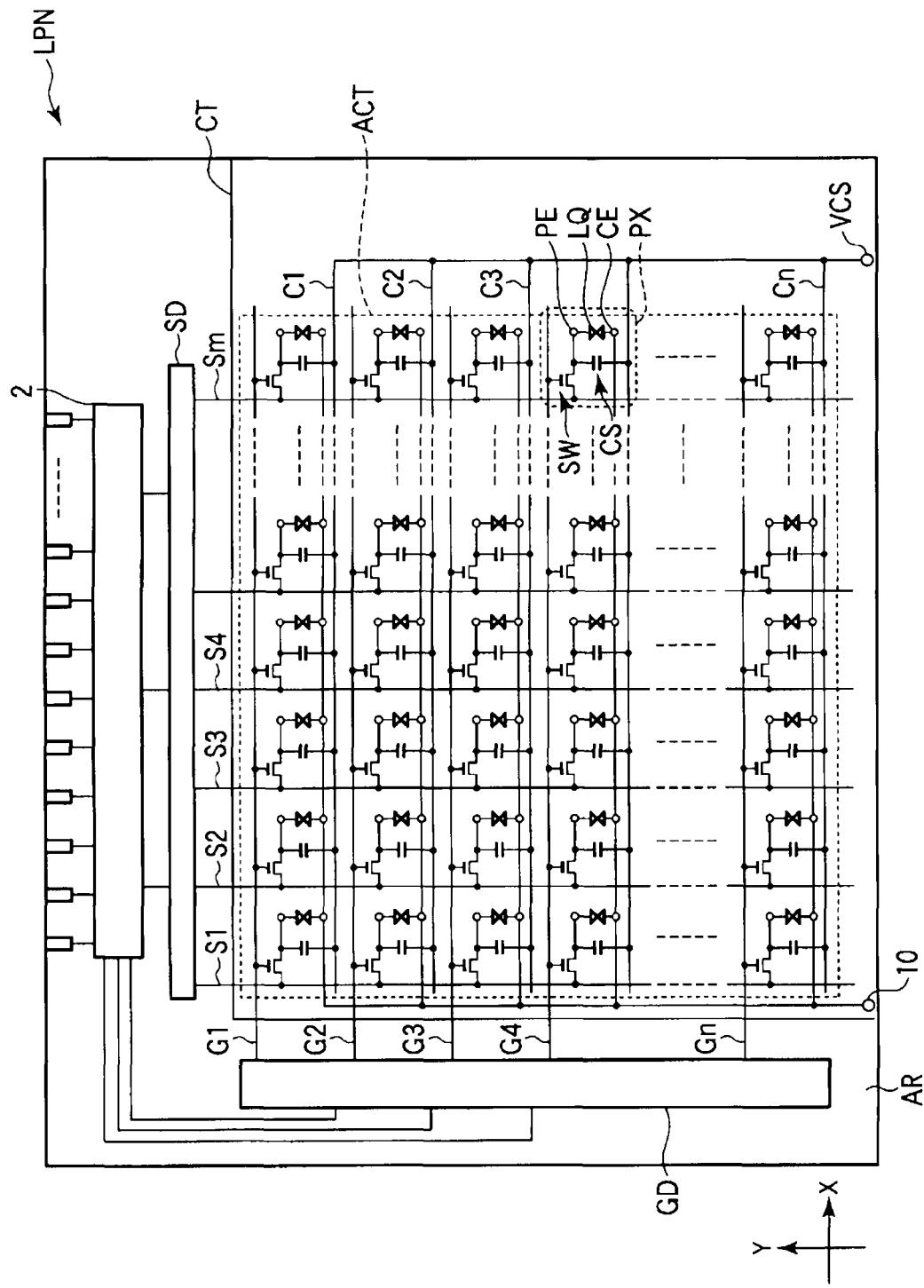
FIG. 2 is a figure schematically showing the structure and an equivalent circuit of the liquid crystal display device panel shown in FIG. 1.

FIG. 2 is a figure schematically showing a structure and an equivalent circuit of the liquid crystal display panel LPN shown in FIG. 1.

The liquid crystal display panel LPN includes n gate lines G (G1-Gn), n auxiliary capacity lines C (C1-Cn), and m source lines S (S1-Sm), etc. in the active area ACT. The gate lines G and the auxiliary capacity lines C extend in a first direction X, respectively. The source lines S extend in a second direction Y that intersects with the gate lines G and the auxiliary capacity lines C, respectively.

Each gate line G is led to the outside of the active area ACT and connected to a gate driver GD. Each source line S is led to the outside of the active area ACT and connected to a source driver SD. The gate driver GD and source driver SD are formed, for example, in the array substrate AR and connected with the driver IC chip 2 equipped with a controller.

Each pixel PX includes a switching element SW, a pixel electrode PE and a counter electrode CE, etc. Retentive capacity Cs is formed, for example, between the auxiliary capacity line C and the pixel electrode PE.

In addition, in this embodiment, the liquid crystal display panel LPN uses a vertical electrical field mode. While the pixel electrode PE is formed in the array substrate AR, the counter electrode CE is formed in the counter substrate CT. The liquid crystal molecules which constitute the liquid crystal layer LQ is switched using mainly the vertical electrical field (namely, electrical field perpendicular with a principal surface of the substrates) formed between the pixel electrodes PE and the counter electrodes CE.

The switching element SW is constituted, for example, by an n channel-type thin film transistor (TFT). The switching element SW is electrically connected with the gate line G and source line S. The (m×n) switching elements SW are formed in the active area ACT.

The pixel electrode PE is electrically connected with the switching element SW. The (m×n) pixel electrodes PE are formed in the active area ACT. The counter electrode CE is kept in a common potential and faces the (m×n) pixel electrodes PE through the liquid crystal layer LQ. The counter electrode CE is electrically connected with an electric power supply portion 10 formed in the array substrate AR through an electric conductive element which is not illustrated. The auxiliary capacity line C is electrically connected with a voltage supplying portion VCS to which an auxiliary capacity voltage is supplied.

Figure 3:
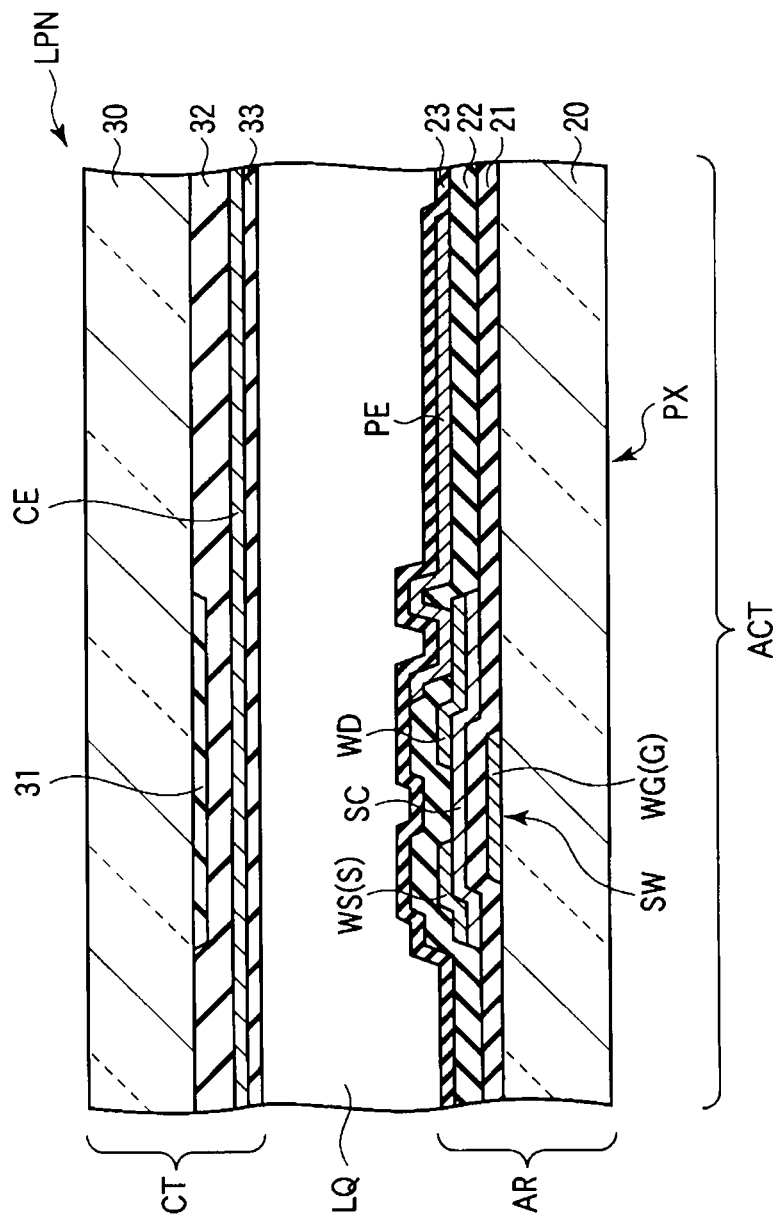
FIG. 3 is a figure schematically showing a cross-sectional view of the liquid crystal display device panel shown in FIG. 2.

FIG. 3 is a figure schematically showing a cross-sectional structure of the liquid crystal display panel LPN shown in FIG. 2. In FIG. 3, a cross-sectional view of the pixel PX in the active area ACT is illustrated.

That is, the array substrate AR is formed of an insulating substrate 20 with light transmissive characteristic such as a glass substrate etc. The array substrate AR includes the switching elements SW on the insulating substrate 20 in the active area ACT. In this embodiment, the switching element SW is formed of a thin film transistor of a bottom gate type.

A gate electrode WG of the switching element SW is formed on the insulating substrate 20. The gate electrode WG is electrically connected with the gate line G. In the illustrated example, the gate electrode WG is integrally formed with the gate line G. The gate electrode WG is covered with a gate insulating film 21. The gate insulating film 21 is arranged also on the insulating substrate 20.

A semiconductor layer SC of the switching element SW is formed on the gate insulating film 21. The semiconductor layer SC is formed of amorphous silicon, for example. A source electrode WS and a drain electrode WD of the switching element SW are in contact with the semiconductor layer SC.

The source electrode WS is electrically connected with the source line S. In the illustrated example, the source electrode WS is integrally formed with the source line S. The source electrode WS and the drain electrode WD are covered with an interlayer insulation film 22. Moreover, the interlayer insulation film 22 is arranged also on the gate insulating film 21. The gate insulating films 21 and interlayer insulation films 22 are formed, for example, of inorganic system materials, such as nitride silicon (SiN).

The pixel electrode PE is formed on the interlayer insulation film 22. The pixel electrode PE is connected with the drain electrode WD through a contact hole which penetrates the interlayer insulation film 22. The pixel electrode PE and the interlayer insulation film 22 are covered with a first alignment film 23.

On the other hand, the counter substrate CT is formed of an insulating substrate 30 with light transmissive characteristics. The counter substrate CT includes a black matrix 31, a color filter layer 32 and the counter electrode CE, etc. on the insulating substrate 30 in the active area ACT.

The black matrix 31 is formed between the pixels PX on the array substrate AR in the active area ACT and opposes to the switching element SW and various lines, such as the gate lines G and the source lines S, etc. as mentioned above. The black matrix 31 can be formed of a black colored resin material or a metal material etc. with light blocking effect, such as chromium (Cr). The color filter layer 32 is arranged in each pixel PX in the active area ACT, and a portion of the color filter layer 32 is laminated by the black matrix 31.

The counter electrode CE in the active area ACT is a continuous film extending on the color filter layer 32 and opposes to the pixel electrode PE of each pixel PX. Moreover, the counter electrode CE extends also to the outside of the active area ACT although to be mentioned later for details. The counter electrode CE is formed of electrically conductive material with light transmissive characteristics, such as Indium Tin Oxide (ITO) and Indium Zinc Oxide (IZO). The counter electrode CE is covered with a second alignment film 33.

In addition, in the counter substrate CT, an overcoat layer consisting of a transparent resin material etc. may be arranged between the color filter layer 32 and the counter electrode CE in order to ease the influence of the concavo-convex surface of the color filter layer 32.

The array substrate AR and the counter substrate CT mentioned above are arranged so that the first alignment film 23 and the second alignment film 33 may oppose each other. At this time, a spacer (for example, pillar-shaped spacer integrally formed on one of the substrates with resin material) which is not illustrated is arranged between the first alignment film 23 of the array substrate AR and the second alignment film 33 of the counter substrate CT. Thereby, a predetermined gap is formed between the substrates.

The liquid crystal layer LQ is encapsulated into the cell gap as mentioned above. That is, the liquid crystal layer LQ is constituted by the liquid crystal composite held between the pixel electrode PE of the array substrate AR and the counter electrode CE of the counter substrate CT.

Figure 4:
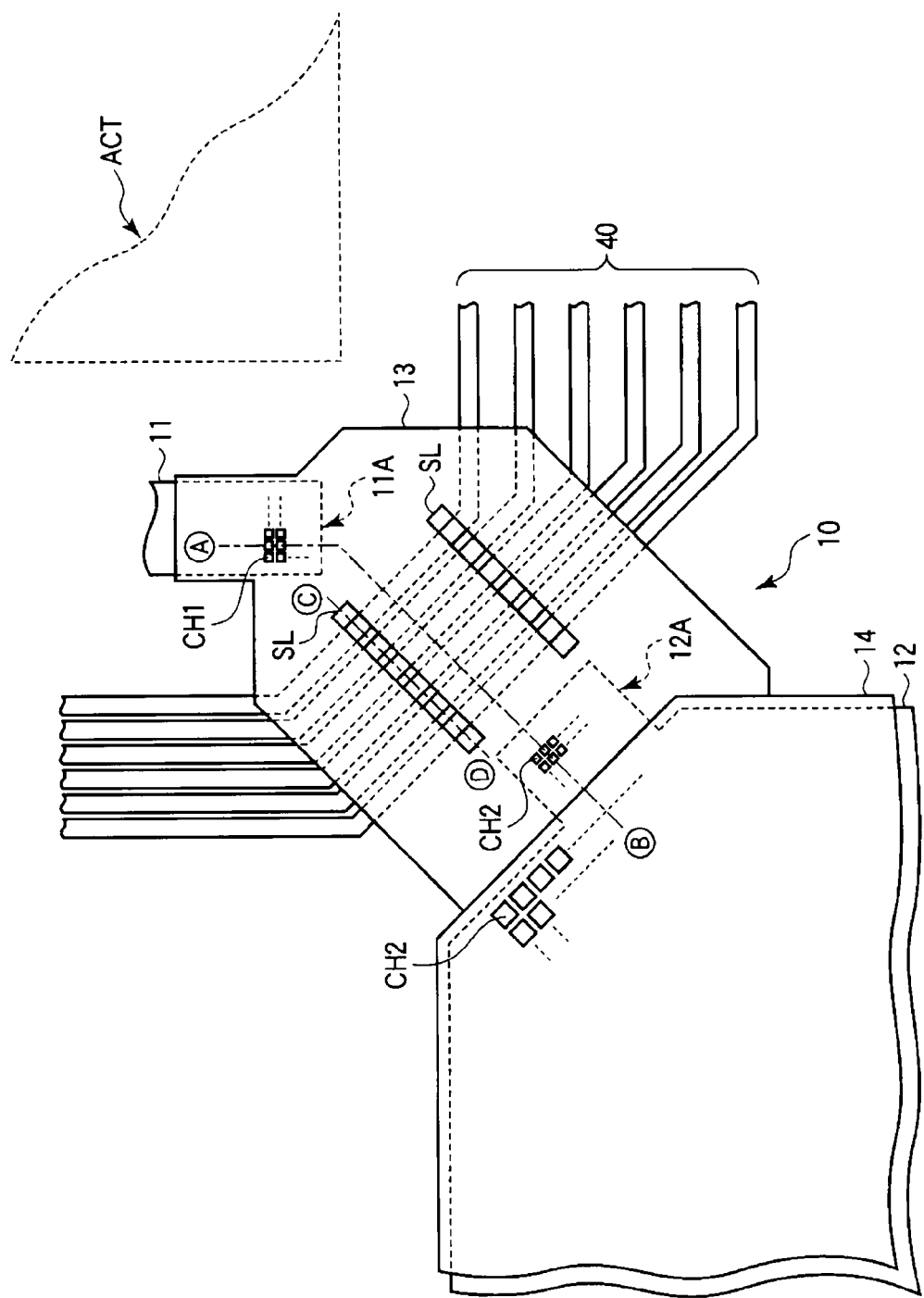
FIG. 4 is a plan view schematically showing an electric power supply portion formed in an array substrate according to the first embodiment.

Next, an electric power supply structure for supplying the voltage from the array substrate AR to the counter electrode CE is explained. FIG. 4 is a plan view schematically showing an electric power supply portion 10 formed in the array substrate AR.

The electric power supply portion 10 is constituted by an electric power supply line 11, an electric power supply electrode 12, a connection electrode 13, and an electric power supply pad 14, etc. The electric power supply line 11 is formed along with the peripheral portion of the array substrate AR, although not explained in detail. In FIG. 4, an end portion 11A of the electric power supply line 11 located in the outside of the active area ACT is illustrated. Moreover, the electric power supply electrode 12, the connection electrode 13, and the electric power supply pad 14 are located in the outside of the active area ACT.

The electric power supply electrode 12 is apart from the electric power supply line 11 and not directly connected. The electric power supply electrode 12 is formed in the shape of an island and arranged, for example, near an angle portion of the array substrate AR. Moreover, the electric power supply electrode 12 has a convex portion 12A projected toward the electric power supply line 11.

A plurality of signal lines 40 are arranged between the end portion 11A of the electric power supply line 11 and the convex portion 12A of the electric power supply electrode 12. In this embodiment, six signal lines 40 cross between the electric power supply line 11 and the electric power supply electrode 12. The signal lines 40 include those to which various signal voltages are applied and need to be electrically insulated from the electric power supply portion 10. As an example, the width of one signal line 40 is about 50 μm, and the width between the adjacent signal lines 40 is about 30 μm.

The electric power supply line 11, the electric power supply electrode 12, and the signal lines 40 are covered with an insulating layer (not illustrated). The gate insulating film 21 and the interlayer insulation film 22 mentioned above are included in the insulating film. Moreover, a first contact hole CH1 penetrating to the electric power supply line 11 and a second contact hole CH2 penetrating to the electric power supply electrode 12 are formed in the insulating film, respectively.

The connection electrode 13 electrically connects the electric power supply line 11 with the electric power supply electrode 12. That is, the connection electrode 13 is in contact with the electric power supply electrode 12 through the second contact hole CH2 while contacting with the electric power supply line 11 through the first contact hole CH1 crossing all the signal lines 40 between the electric power supply line 11 and the electric power supply electrode 12. In the illustrated example, the connection electrode 13 extends from above the end portion 11A of the electric power supply line 11 to above the convex portion 12A of the electric power supply electrode 12.

Moreover, at least one slit SL is formed in the connection electrode 13. The slit SL extends in a direction which intersects with the signal lines 40. The slit SL is formed between the electric power supply line 11 and the electric power supply electrode 12 and not formed above the electric power supply line 11 and the electric power supply electrode 12.

In this embodiment, two slits SL are formed in the connection electrode 13 in parallel. That is, the connection electrode 13 connected to the electric power supply line 11 is branched into three portions above the signal lines 40. Then, the respective branched portions of the connection electrodes 13 are again combined with one and connected with the single electric power supply electrode 12. The width of the respective branched portions of the connection electrode 13 is almost the same. As an example, the width of the slit SL is about 10 μm, and each width of the branched three portions by two slits is about 100 μm. In addition, the "width" in this embodiment is the length along a direction along which the signal lines 40 extend.

Moreover, in this embodiment, the slit SL intersects with all the signal lines 40 (that is, six signal lines 40) between the electric power supply line 11 and the electric power supply electrode 12 and formed into a rectangular shape in which the slit has a long side in a direction which intersects orthogonally with the signal lines 40 and a short side in parallel with the signal lines 40. In addition, although each of four angle portions of the slit SL is formed so as to be approximately right angle, they may have roundness slightly.

The electric power supply pad 14 is located above the electric power supply electrode 12 and electrically connected with the electric power supply electrode 12. In this embodiment, the electric power supply pad 14 is in contact with the electric power supply electrode 12 through the second contact hole CH2. Moreover, the electric power supply pad 14 is integrally formed with the connection electrode 13, and the connection electrode 13 and the electric power supply pad 14 are connected without disconnection.

Figure 5:
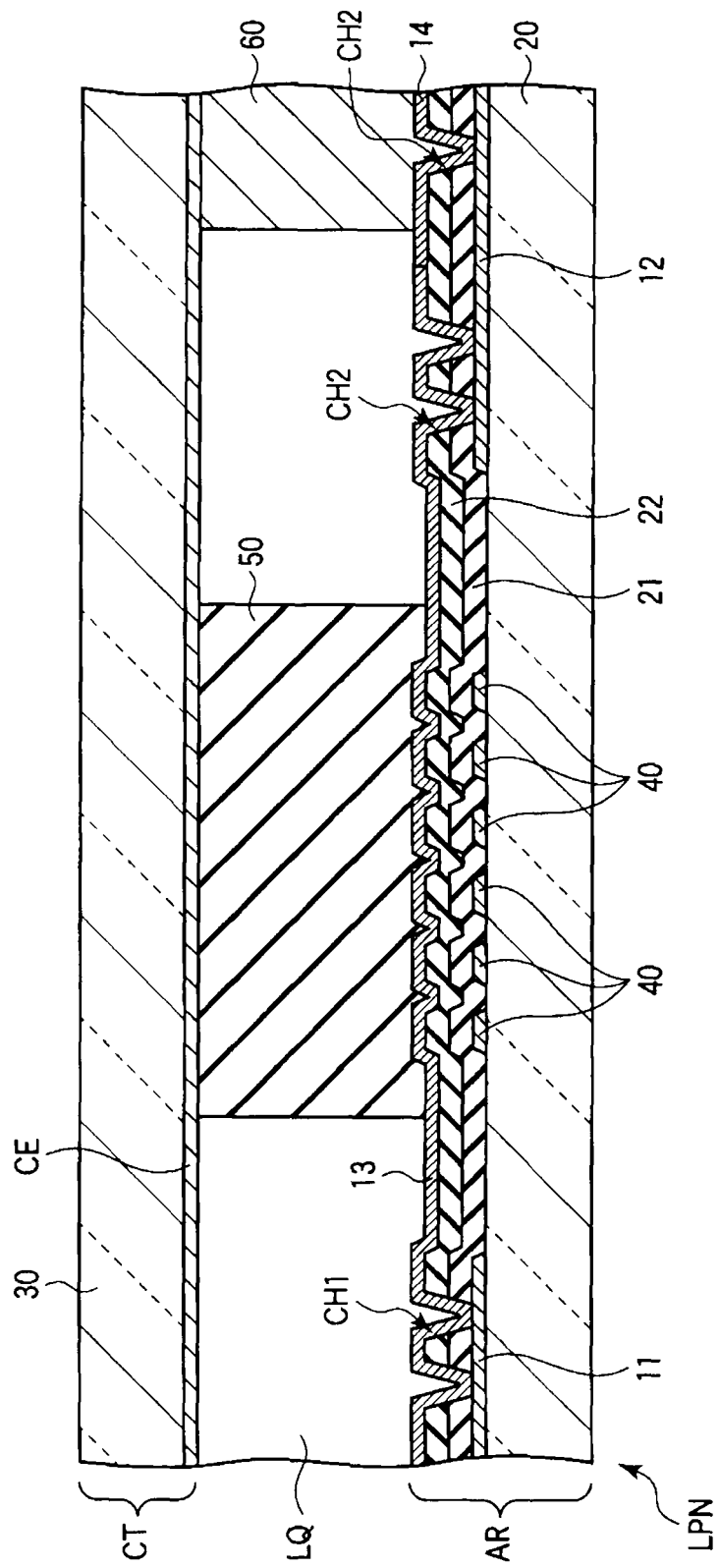
FIG. 5 is a figure schematically showing a cross-sectional view taken along line A-B of the electric power supply portion of the liquid crystal display device panel shown in FIG. 4.

FIG. 5 is a figure schematically showing a cross-sectional structure of the liquid crystal display panel LPN taken along line A-B of the electric power supply portion 10 shown in FIG. 4. FIG. 5 shows the cross-sectional view of the liquid crystal display panel LPN between two slits SL in the connection electrode 13.

On the insulating substrate 20 constituting the array substrate AR, the electric power supply line 11 and the electric power supply electrode 12 are formed, and the signal lines 40 are formed between the electric power supply line 11 and electric power supply electrodes 12. The electric power supply line 11, the electric power supply electrode 12 and the signal lines 40 are formed of the same electrically conductive layers as the gate line G explained previously, and the lines are formed of the same material as the gate line G.

The gate insulating film 21 covers the electric power supply line 11, the electric power supply electrode 12 and the signal lines 40. Moreover, the gate insulating film 21 also covers the insulating substrate 20 between the electric power supply line 11 and the signal lines 40, between the respective signal lines 40, and between the signal line 40 and the electric power supply electrode 12. The interlayer insulation film 22 is laminated on the gate insulating film 21.

The first contact hole CH1 penetrates the gate insulating film 21 and the interlayer insulation film 22 to the electric power supply line 11. Similarly, the second contact hole CH2 penetrates the gate insulating film 21 and the interlayer insulation film 22 to the electric power supply electrode 12.

The connection electrode 13 is formed on the interlayer insulation film 22. The connection electrode 13 contacts with the electric power supply line 11 through the first contact hole CH1 and crosses above the signal lines 40. Then, the connection electrode 13 is in contact with the electric power supply electrode 12 through the second contact hole CH2. The electric power supply pad 14 is formed on the interlayer insulation film 22. The electric power supply pad 14 is in contact with the electric power supply electrode 12 through the second contact hole CH2. The connection electrodes 13 and the electric power supply pad 14 are formed of the same electric conductive layers as the pixel electrode PE explained previously and are formed of the same material as the pixel electrode PE. In addition, in this embodiment, the connection electrode 13 and the electric power supply pad 14 are connected on the interlayer insulation film 22.

The counter substrate CT with the counter electrode CE is attached to the array substrate AR by the seal element 50 arranged along the peripheral of the substrates. The seal element 50 is arranged, for example, near above the signal line 40. Inside the seal element 50, the liquid crystal layer LQ is held between the array substrate AR and the counter substrate CT. Although not illustrated, the active area ACT is formed inside the seal element 50.

The electric power supply pad 14 is formed outside the seal element 50. The counter electrode CE is formed so as to extend beyond the position where the seal element 50 is arranged. That is, the counter electrode CE faces the pixel electrodes PE in the active area ACT inside the seal element 50 as shown in FIG. 3. The counter electrode CE extends to above the electric power supply pad 14 beyond the position where the seal element 50 is arranged.

An electrically conductive element 60 contacts with the electric power supply pad 14 and the counter electrode CE, and electrically connects between the electric power supply pad 14 and the counter electrode CE. Thereby, the voltage applied to the electric power supply line 11 is supplied to the electric power supply pad 14 through the connection electrode 13 and the electric power supply electrode 12. The electric power is further supplied to the counter electrode CE through the electrically conductive element 60.

Figure 6:
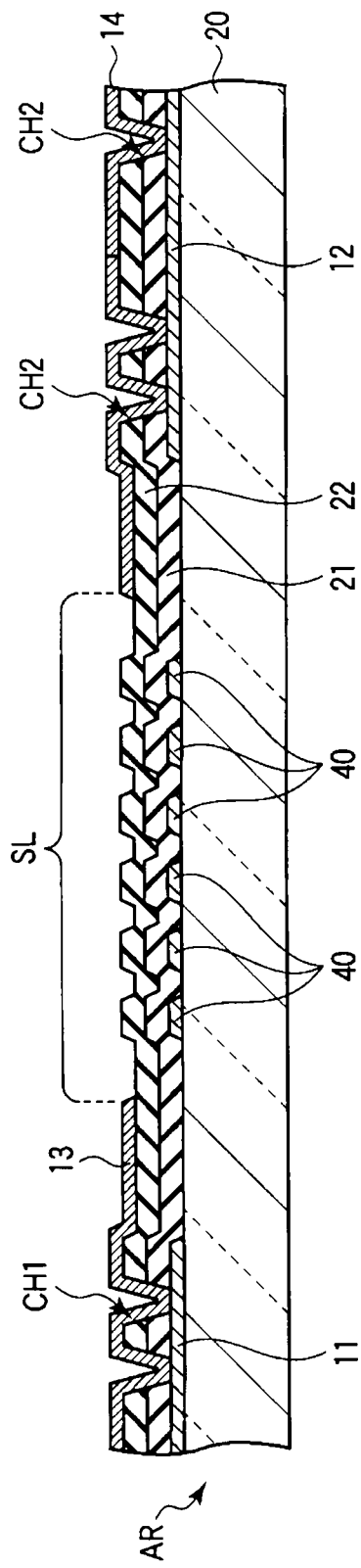
FIG. 6 is a figure schematically showing a cross-sectional view taken along line C-D of the electric power supply portion of the liquid crystal display device panel shown in FIG. 4.

FIG. 6 is a figure schematically showing a cross-sectional structure of the array substrate AR taken along line C-D of the electric power supply portion 10 shown in FIG. 4. FIG. 6 shows a cross-sectional view of the array substrate AR in which the slit SL is formed in the connection electrode 13.

The slit SL formed in the connection electrode 13 penetrates the interlayer insulation film 22 which is a base for the connection electrode 13. That is, the connection electrode 13 is removed in the slit SL. In this embodiment, the slit SL is formed so as to cross the six signal lines 40.

In this embodiment, the step of the interlayer insulation film 22 and the gate insulating film 21 are formed by the concavo-convex surface of the signal lines 40. Since the step is steep, the film thickness of the connection electrode 13 formed on the interlayer insulation film 22 becomes thin locally with ease. Especially, the film thickness of the connection electrode 13 becomes thin easily along a direction (a vertical direction of the sheet in FIG. 5) which the signal lines 40 extend. Moreover, in the above signal lines 40, if the semiconductor layer SC is arranged between the gate insulating film 21 and the interlayer insulation film 22, a bigger step is formed in the surface of the interlayer insulation film 22 used as the base for the connection electrode 13. Accordingly, the film thickness of the connection electrode 13 covering the step portion tends to become thinner.

For this reason, when an electrostatic discharge damage occurs in the connection electrode 13 or the signal lines 40, a crack progresses linearly in a direction along which the signal lines 40 extend, that is, at the thin portions of the connection electrode 13 covering the step formed by the signal lines 40. Therefore, there is a possibility of generating disconnection (crack disconnection).

When the slit SL is not formed in the connection electrode 13, the progress of the crack cannot be stopped. In the worst case, the connection electrode 13 arranged so as to cross the signal lines 40 is electrically separated into a portion connected to the electric power supply line 11 and a portion connected to the electric power supply electrode 12. Therefore, the electric power supply from the electric power supply line 11 to the counter electrode CE may become impossible.

On the other hand, in this embodiment, the slit SL extending in the direction which intersects with the signal lines 40 is formed in the connection electrode 13. For this reason, even if the crack progresses in the extending direction of the connection electrode 13 due to the generation of the electrostatic discharge damage, the progress of the crack stops at the slit SL. That is, it becomes possible to suppress the progress of the crack beyond the slit SL in the connection electrode 13.

Figure 7:
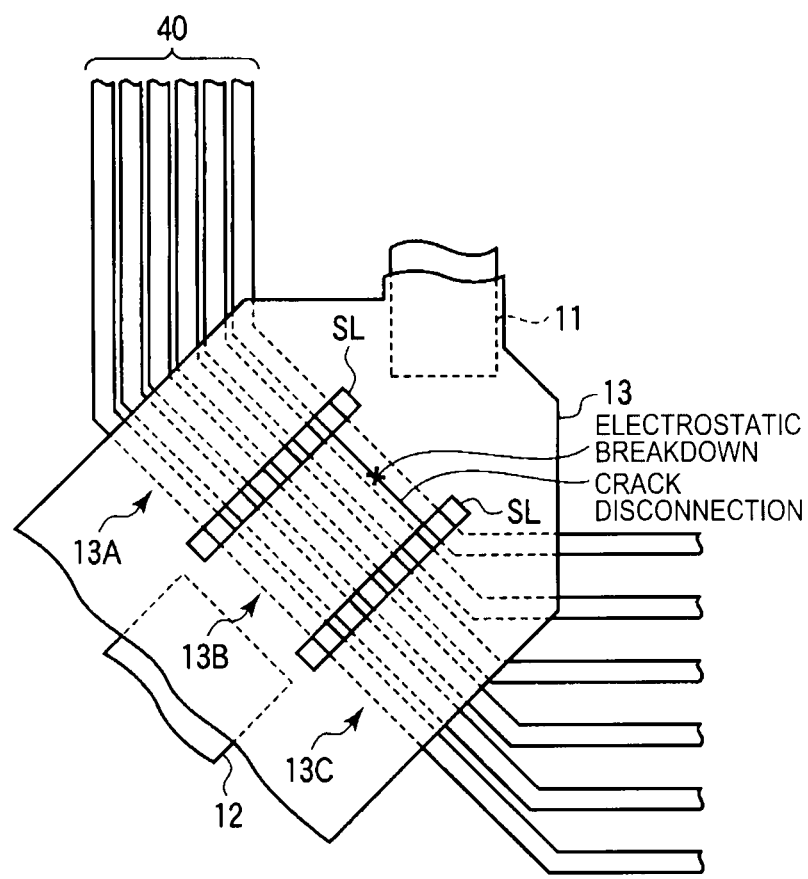
FIG. 7 is a figure for explaining crack disconnection when electrostatic discharge damage occurs in the electric power supply portion shown in FIG. 4.

In the structure according to this embodiment in which two slits SL are formed in the connection electrode 13, three electrode portions 13A, 13B, and 13C are formed by branching the connection electrode 13 by the slits SL as shown in FIG. 7. Accordingly, even if a crack progresses and the crack disconnection occurs, for example, at the portion shown by x in the figure in the electrode portion 13B of the connection electrode 13 due to the electrostatic discharge damage, the progress of the crack stops by two slits SL sandwiching the electrode portion 13B.

Therefore, the connection electrode 13 can connect the electric power supply line 11 with the electric power supply electrode 12 (and electric power supply pad 14) by other two electrode portions 13A and 13C. The electrode portions 13A and 13C respectively have a sufficient width (for example, 100 μm) for electric power supply. Accordingly, even if the electrode portion 13B is disconnected, it becomes possible to secure the electrical connection from the electric power supply line 11 to the counter electrode CE without causing the extreme rise of line resistance.

In this embodiment, the connection electrode 13 and the electric power supply pad 14 may be separated on the interlayer insulation film 22. That is, the connection electrode 13 and the electric power supply pad 14 are not integrally formed, but separately formed. However, as explained with reference to FIG. 4 etc., it becomes possible to prevent the generation of the disconnection due to the electrostatic discharge damage more by forming integrally the connection electrode 13 and the electric power supply pad 14.

Figure 8:
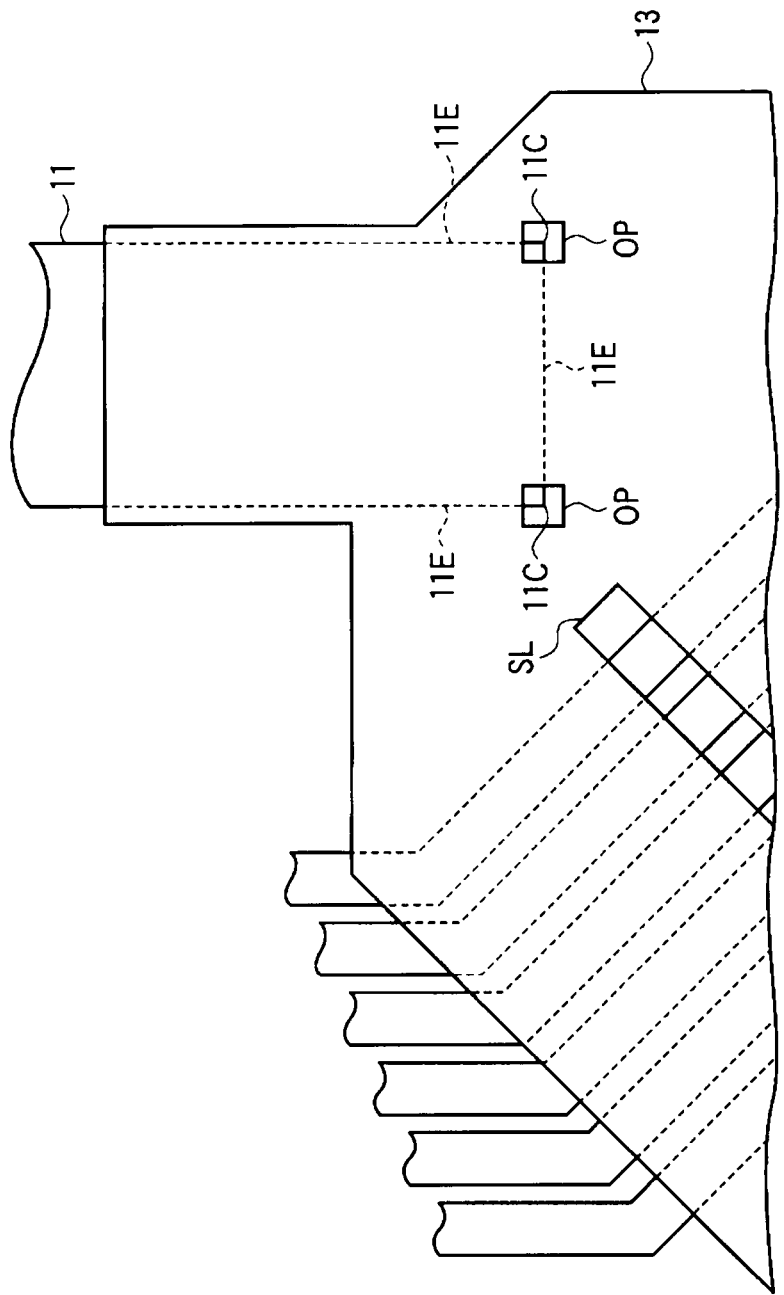
FIG. 8 is a plan view schematically showing an electric power supply portion according to a second embodiment in the present invention.

FIG. 8 is a plan view schematically showing a structure of the electric power supply portion 10 according to a second embodiment. In FIG. 8, a portion of the electric power supply portion 10 required for explanation is expanded.

As compared with the structure shown in FIG. 4 etc., the second embodiment is different in the point that the connection electrode 13 further includes an opening OP formed above an angle portion 11C of the electric power supply line 11. In this embodiment, the opening OP is formed above the two angle portions 11C of the electric power supply line 11 with which the connection electrode 13 overlaps. In the openings OP, the connection electrode 13 is removed and penetrates to the interlayer insulation film 22 which is a base for the connection electrode 13. In addition, it is possible to form one opening at either one portion of two angle portions 11C. Although the respective openings OP are formed in the shape of an approximately square, the form may not be limited to the square shape, and it may be, for example, a round shape etc.

A step is formed in an edge portion 11E of the electric power supply line 11 like the signal lines 40 explained previously. Accordingly, when an electrostatic discharge damage occurs in the electric power supply line 11 or in the connection electrode 13 above the electric power supply line 11, a crack progresses along with the edge portion 11E of the electric power supply line 11, and there is a possibility of producing the crack disconnection.

For this reason, it becomes possible to stop the crack which progresses along with the edge portion 11E by the opening OP formed in the connection electrode 13 located above the angle portion 11C of the electric power supply line 11, and also possible to stop the electrostatic discharge damage to the minimum.

In addition, although not illustrated, the opening OP may be further formed in the connection electrode 13 above the angle portion of the electric power supply electrode 12. When such structure is applied, it becomes possible to stop the crack which progresses along with the edge portion of the electric power supply electrode 12, and also possible to stop an electrostatic discharge damage to the minimum.

Moreover, the crack easily progresses in a linear fashion in a portion in which the electric power supply line 11 covers the step portion or the film thickness is thin locally. Therefore, in the connection electrode 13, it is possible to prevent the generation of the crack disconnection and stop the electrostatic discharge damage to the minimum by forming the openings and the slits, and by removing the connection electrode 13 in other portions to which other cracks progress easily.

Furthermore, according to this embodiment, the connection electrode 13 and the electric power supply pad 14 arranged on the interlayer insulation film 22 are formed of the same material as the pixel electrode PE similarly formed on the interlayer insulation film 22. For this reason, it becomes possible to form simultaneously the connection electrode 13, the electric power supply pad 14, and the slit SL formed in the connection electrode 13 with the pixel electrode PE without increasing a manufacturing process.

In this embodiment, although the slit SL in the connection electrode 13 is formed in an approximately rectangular shape which has four angle portions, the slit SL is not restricted to the example.

Figure 9:
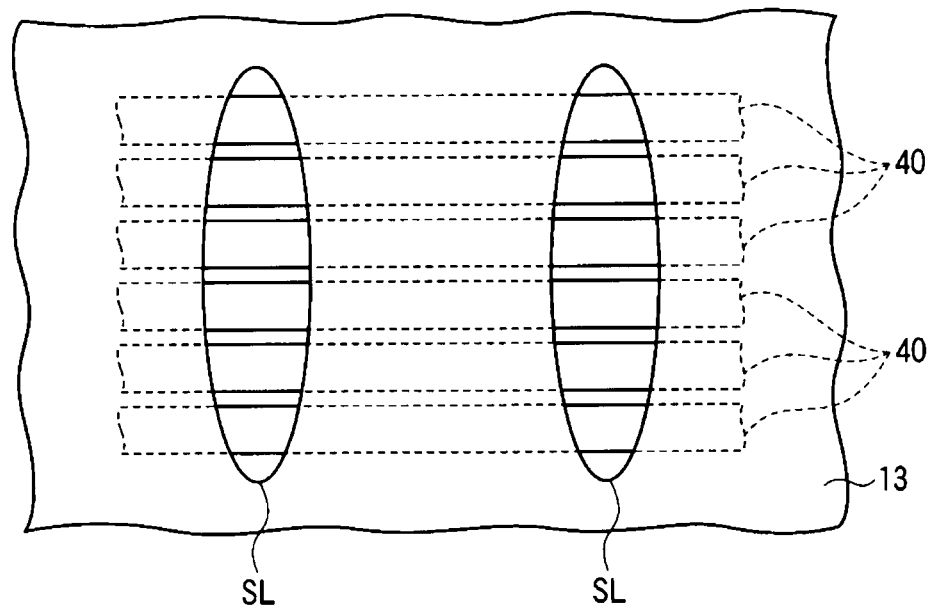
FIG. 9 and FIG. 10 respectively show plan views for explaining other forms of a slit formed in a connection electrode.

For example, as shown in FIG. 9, the slit SL may be formed in the shape of an ellipse with a long axis in a direction which intersects orthogonally with the signal lines 40. With the shape of the ellipse here, not only the ellipse form but a track form in which two circles with an equal radius are connected by common circumscription lines is included.

Figure 10:
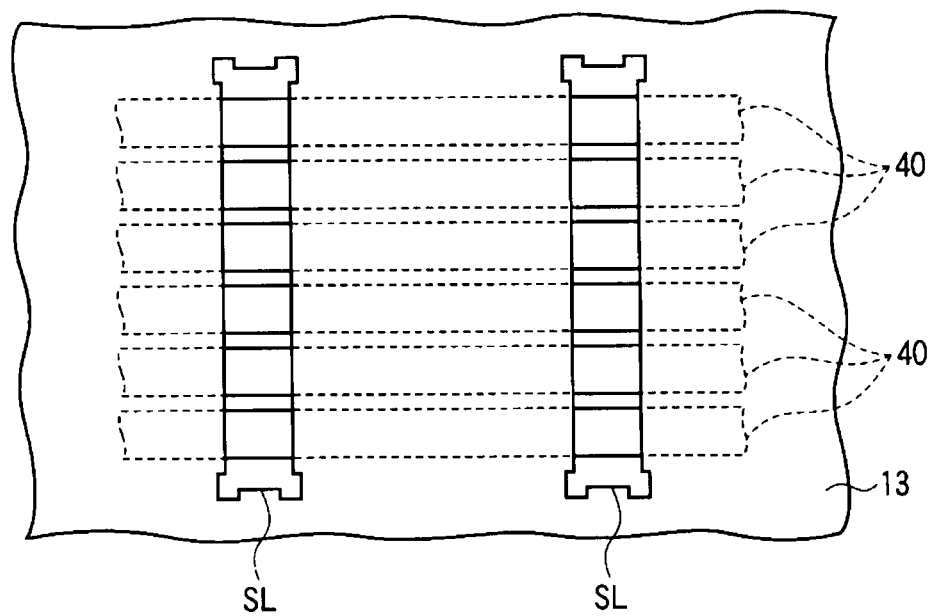

Moreover, as shown in FIG. 10, the slit SL may be an approximately rectangular form in which four angle portions are cut away toward the outside of the slit SL.

An electrostatic break down test was done about the electric power supply portion 10 according to this embodiment. According to the test, when a voltage of 5 kV is applied to the electric power supply portion 10, there is no trace of the electrostatic discharge damage in any portions of the connection electrode 13. When a voltage of 10 kV was applied, the trace of the electrostatic discharge damage was observed in one of the three branched portions in the connection electrode 13. When a voltage of 15 kV was applied, the trace of the electrostatic discharge damage was observed in two of the three branched portions in the connection electrode 13. Furthermore, when a voltage of 20 kV was applied, the trace of the electrostatic discharge damage was observed in all the three branched portions in the connection electrode 13.

According to the test, it was affirmed that the electrostatic break down voltage in the electric power supply portion 10 is 15 kV according to this embodiment. That is, if the voltage is 15 kV or less, the electrostatic discharge damage does not occur in at least one of the branched electrode portions in the connection electrode 13. Accordingly, the electrical connection between the electric power supply line 11 and the counter electrode CE can be secured.

The embodiments can be applied to the liquid crystal display device equipped with the electric power supply structure for supplying electric power to the counter substrate CT from array substrate AR, and the liquid crystal mode is not limited to special one. Moreover, the liquid crystal display device panel LPN may be a transmissive type to propagate the light selectively or a reflecting type to reflect the light selectively.

Moreover, in the embodiments, the case where two slits SL are formed in the connection electrode 13 is explained. However, if at least one slit SL is formed, it is possible to stop the progress of the crack disconnection produced in the connection electrode 13, and the disconnection between the electric power supply line 11 and the electric power supply electrode 12 can be suppressed. Of course, three or more slits SL may be formed in the connection electrode 13. In addition, in each electrode portion branched by the slit SL in the connection electrode 13, it is desirable to have sufficient width for electric power supply so that the rise of line resistance does not prevent the electric power supply to the counter electrode CE from the electric power supply line 11.

Furthermore, although according to above embodiments, the thin film transistor constituting the switching element SW is formed of the semiconductor layer SC using the amorphous silicon, the semiconductor layer SC using poly-silicon can be also employed.

While certain embodiments have been described, these embodiments have been presented by way of example only, and are not intended to limit the scope of the inventions. In practice, the structural element can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A liquid crystal display device;
   a first insulating substrate and a second insulating substrate opposing the first insulating substrate;
   a plurality of pixel electrodes in the shape of a matrix formed on the first insulating substrate;
   an electric power supply line formed along a perimeter of the first insulating substrate;
   an electric power supply pad arranged at a corner portion of the first insulating substrate apart from the electric power supply line;
   a plurality of signal lines formed on the first insulating substrate crossing between the electric power supply line and the electric power supply pad;
   an insulating layer covering the signal lines;

a connection electrode arranged on the insulating layer for connecting the electric power supply line and the electric power supply pad;
at least one slit formed in the connection electrode extending in a direction so as to cross the signal lines;
a counter electrode formed on the second insulating substrate and extending to above the electric power supply pad, the counter electrode facing the pixel electrodes;
an electrically conductive element to connect the electric power supply pad with the counter electrode; and
a liquid crystal layer held between the first and second substrates,
wherein the slit is formed in a rectangular shape with a long side in the direction orthogonally crossing with the signal lines and a short side in the parallel direction with the signal lines.

2. A liquid crystal display device;
a first insulating substrate and a second insulating substrate opposing the first insulating substrate;
a plurality of pixel electrodes in the shape of a matrix formed on the first insulating substrate;
an electric power supply line formed along a perimeter of the first insulating substrate;
an electric power supply pad arranged at a corner portion of the first insulating substrate apart from the electric power supply line;
a plurality of signal lines formed on the first insulating substrate crossing between the electric power supply line and the electric power supply pad;
an insulating layer covering the signal lines;
a connection electrode arranged on the insulating layer for connecting the electric power supply line and the electric power supply pad;
at least one slit formed in the connection electrode extending in a direction so as to cross the signal lines;
a counter electrode formed on the second insulating substrate and extending to above the electric power supply pad, the counter electrode facing the pixel electrodes;
an electrically conductive element to connect the electric power supply pad with the counter electrode; and
a liquid crystal layer held between the first and second substrates,
wherein the slit is formed in a ellipse shape with a long axis in the direction orthogonally crossing with the signal lines.

3. A liquid crystal display device;
a first insulating substrate and a second insulating substrate opposing the first insulating substrate;
a plurality of pixel electrodes in the shape of a matrix formed on the first insulating substrate;
an electric power supply line formed along a perimeter of the first insulating substrate;
an electric power supply electrode arranged at a corner portion of the first insulating substrate apart from the electric power supply line;
a plurality of signal lines formed on the first insulating substrate crossing between the electric power supply line and the electric power supply electrode;
an insulating layer covering the signal lines and including a first contact hole penetrating to the electric power supply line and a second contact hole penetrating to the electric power supply electrode;
a connection electrode arranged on the insulating layer for connecting the power supply line and the power supply electrode through the first and second contact holes, respectively;
at least one slit formed in the connection electrode extending in a direction so as to cross the signal lines;
an electric power supply pad electrically connected with the electric power supply electrode;
a counter electrode formed on the second insulating substrate and extending to above the electric power supply pad, the counter electrode facing the pixel electrodes;
an electrically conductive element to connect the electric power supply pad with the counter electrode; and
a liquid crystal layer held between the first and second substrates.

4. The liquid crystal display device according to claim 3, wherein the connection electrode and the power supply pad are integrally formed.

5. The liquid crystal display device according to claim 3, wherein an aperture is formed in the connection electrode above a corner of the power supply line.

6. The liquid crystal display device according to claim 3, wherein the connection electrode and the power supply pad are formed of the same material as the pixel electrode.

7. The liquid crystal display device according to claim 3, wherein the slit is formed in a rectangular shape with a long side in the direction orthogonally crossing with the signal line and a short side in the parallel direction with the signal lines.

8. The liquid crystal display device; according to claim 3, wherein the slit is formed in a ellipse shape with a long axis in the direction orthogonally crossing with the signal lines.

9. The liquid crystal display device according to claim 3, wherein the connection electrode is divided into two or more electrode portions by the slit.

10. The liquid crystal display device according to claim 3, wherein the second contact hole is formed in the insulating layer under the connection electrode and the power supply pad.

11. The liquid crystal display device according to claim 3, wherein the power supply line includes a first projecting portion projected toward the power supply electrode, and the first contact hole is formed in the first projecting portion.

12. The liquid crystal display device according to claim 3, wherein the power supply electrode include a second projecting portion projected toward the power supply line, and the second contact hole is formed in the second projecting portion.

13. A liquid crystal display device;
a first insulating substrate and a second insulating substrate opposing the first insulating substrate;
a plurality of pixel transistors with a gate insulating film and a gate electrode in the shape of a matrix formed on the first insulating substrate;
an electric power supply line formed along a perimeter of the first insulating substrate;
an electric power supply electrode arranged at a corner portion of the first insulating substrate apart from the electric power supply line;
a plurality of signal lines formed on the first insulating substrate crossing between the electric power supply line and the electric power supply electrode and forming a concavo-convex surface on the first substrate;
an insulating layer including an interlayer insulating film covering the signal lines, the insulating layer including a first contact hole penetrating to the electric power supply line and a second contact hole penetrating to the electric power supply electrode;
a connection electrode arranged on the insulating layer for connecting the electric power supply line and the electric power supply electrode through the first and second contact holes, respectively;

at least one slit formed in the connection electrode extending in a direction so as to cross the signal lines;

an electric power supply pad electrically connected with the electric power supply electrode;

a counter electrode formed on the second insulating substrate and extending to above the electric power supply pad, the counter electrode facing the pixel electrodes;

an electrically conductive element to connect the electric power supply pad with the counter electrode; and a liquid crystal layer held between the first and second substrates.

14. The liquid crystal display device according to claim 13, wherein the insulating layer includes a gate insulating film formed between the interlayer insulating film and the first substrate.

15. The liquid crystal display device according to claim 13, wherein the connection electrode and the power supply pad are integrally formed.

16. The liquid crystal display device according to claim 13, wherein an aperture is formed in the connection electrode above a corner of the power supply line.

17. The liquid crystal display device according to claim 13, wherein the connection electrode and the power supply pad are formed of the same material as the pixel electrode.

18. The liquid crystal display device according to claim 13, wherein the slit is formed in a rectangular shape with a long side in the direction orthogonally crossing with the signal lines and a short side in the parallel direction with the signal lines.

19. The liquid crystal display device; according to claim 13, wherein the slit is formed in a ellipse shape with a long axis in the direction orthogonally crossing with the signal lines.

20. The liquid crystal display device according to claim 13, wherein the connection electrode is divided into two or more electrode portions by the slit.

21. The liquid crystal display device; according to claim 13, wherein the second contact hole is formed in the insulating layer under the connection electrode and the power supply pad.

22. The liquid crystal display device; according to claim 13, wherein the power supply line includes a first projecting portion projected toward the power supply electrode, and the first contact hole is formed in the first projecting portion.

23. The liquid crystal display device; according to claim 13, the power supply electrode include a second projecting portion projected toward the power supply line, and the second contact hole is formed in the second projecting portion.

24. The liquid crystal display device according to claim 1, wherein the connection electrode and the power supply pad are integrally formed.

25. The liquid crystal display device according to claim 1, wherein an aperature is formed in the connection electrode above a corner of the power supply line.

26. The liquid crystal display device according to claim 1, wherein the connection electrode and the power supply pad are formed of the same material as the pixel electrode.

27. The liquid crystal display device according to claim 1, wherein the connection electrode is divided into two or more electrode portions by the slit.

28. The liquid crystal display device according to claim 2, wherein the connection electrode and the power supply pad are integrally formed.

29. The liquid crystal display device according to claim 2, wherein an aperature is formed in the connection electrode above a corner of the power supply line.

30. The liquid crystal display device according to claim 2, wherein the connection electrode and the power supply pad are formed of the same material as the pixel electrode.

31. The liquid crystal display device according to claim 2, wherein the connection electrode is divided into two or more electrode portions by the slit.

* * * * *